A. E. ANGOLD.
ELECTRIC ARC LAMP.
APPLICATION FILED MAR. 23, 1908.

1,019,292.

Patented Mar. 5, 1912.
7 SHEETS—SHEET 1.

Fig. 1.

A. E. ANGOLD.
ELECTRIC ARC LAMP.
APPLICATION FILED MAR. 23, 1908.

1,019,292.

Patented Mar. 5, 1912.
7 SHEETS—SHEET 2.

A. E. ANGOLD.
ELECTRIC ARC LAMP.
APPLICATION FILED MAR. 23, 1908.

1,019,292.

Patented Mar. 5, 1912.
7 SHEETS—SHEET 4.

UNITED STATES PATENT OFFICE.

ARTHUR ERNEST ANGOLD, OF MANCHESTER, ENGLAND.

ELECTRIC-ARC LAMP.

1,019,292.  Specification of Letters Patent.  Patented Mar. 5, 1912.

Application filed March 23, 1908. Serial No. 422,827.

*To all whom it may concern:*

Be it known that I, ARTHUR ERNEST ANGOLD, a subject of the King of Great Britain and Ireland, and resident of Manchester, in the county of Lancaster, England, electrical engineer, have invented certain new and useful Improvements in Electric-Arc Lamps, of which the following is a specification.

This invention relates to improvements in electric arc magazine lamps and particularly to that type in which the carbons lean outwardly and the arc is formed between the lower and adjacent ends, the object being to provide improved means for holding, feeding and adjusting the carbons so that the current is more effectively carried to them at points as near as practical to the arc, a further object being to enable carbons of small diameter without metal cores or coating to be employed and yet not give trouble from a drop of voltage along them and at the same time preventing deterioration of the contact.

My invention will be fully described with reference to the accompanying drawings in which—

Fig. 5 is a plan view taken on the line 1—2 of Fig. 3 showing the arrangement of the carbon magazines with the solenoids removed, Fig. 6 side elevation of feeding-pawl mechanism to an enlarged scale, Fig. 7 plan of same, Fig. 8 front elevation, Fig. 9 end elevation to an enlarged scale of the mechanism for making and breaking the solenoid circuit, Fig. 10 side elevation of same, Fig. 11 plan, Fig. 12 partial sectional elevation of carbon magazine showing gripping jaws, Fig. 13 is a sectional view taken on the line B—B of Fig. 12, Fig. 14 side elevation showing modified means for pushing down the carbons, Fig. 15 front elevation of same and Fig. 16 is a sectional view taken on the line C—C of Fig. 15, Fig. 18 is a fragmentary sectional view in elevation, showing in detail the lever $o$ immediately after making contact with the stop $p^2$.

Figure 12:
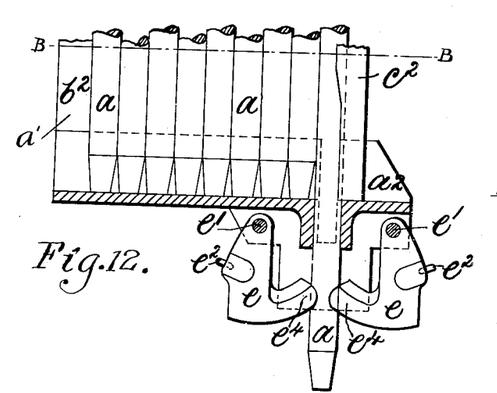

In carrying out my invention $a$ represents the carbons, the first two of which are indicated in practically operative position partly in full lines, the remainder being shown by broken lines in position in the magazines $a^1$ with their lower ends in two parallel files. The two sets of carbons are arranged at an inclination to the axis of the lamp, their lower ends are in the same plane while their upper ends lie in a curved formation. This is effected by the improved construction of each magazine which consists of a bottom member $a^2$ having a straight groove $a^3$ in which the carbons rest, a top inverted member $b$ having a curved groove $b^1$ and a plate $b^2$ connecting the two, the latter being twisted or bent into a warped surface so that when the carbons are being placed in position through the base of the lamp they are guided into the curved groove $b^1$ without interfering with the lamp mechanism. The plate $b^2$ is situated upon the inner side of the magazine, the up-turned edge of the member $a^2$ and the down-turned edge of the member $b$ being sufficient to prevent the carbons from outward displacement. The curving of the top channel of the magazine is done for two reasons. First it allows the lamp mechanism to be contained in a smaller diameter case, and secondly the transmission of the side pressure from carbon to carbon is independent of the slight curvature sometimes present in the carbons themselves. By not standing in the same plane it is possible to get each carbon to touch its neighbors on the same transverse line as that in which pressure is applied; therefore considerable pressure can be exerted without any danger of breaking a curved carbon. The pressure is applied by an arm $b^3$, pivoted at $c$, to the outer side of the member $b$, its lower end $b^4$ being bent inwardly and adapted to engage with the outermost carbon while its upper end is controlled by a spring $c^1$ to exert the necessary pressure. At the inner ends the members $a^2$ and $b$ are joined by inclined rods $c^2$ having transversely-curved beds $c^3$ for the operating carbons to rest and slide in. Each lower bracket $a^2$ has a hole in it registering with the bed $c^3$ so that the carbons are guided when pushed down till they touch each other. Between one end of each plate $b^2$ and the corresponding bar $c^2$ a space $d$ is left to admit of the free passage of the arms $d'$ and $d^2$ of a carbon feeding bar, said spaces being continued below and above the level of the grooves $a^3$ and $b^1$, in the members $a^2$ and $b$, respectively, to enable the lower end of the push bar to ascend above and descend below the grooves in the said members $a^2$ and $b$ said spaces being of such a length, however, as to prevent the upper end of said push bar from descending below the lower ends of the carbons in the magazines.
The operative carbons are slidably-supported in the rods $c^2$ first by the lateral pressure of the inoperative carbons against them and secondly by spring-controlled jaws $e$, $e$ carried by the members $a^2$ at the lower ends of the magazine. Two jaws $e$ are employed, see Figs. 4 and 12, one at each side of each carbon, pivoted at $e^1$ and pressed toward the carbon by a spring $e^2$ common to both. The contact faces $e^3$ of the jaws are formed on arms $e^4$ struck from the pivotal centers of the jaws so that as they wear away and turn toward the carbon they always present a similar extent of surface to the carbon and grip at the same position relatively to the remainder of the magazine. Further the arrangement of the jaws admits of the advancing carbon pushing them back to their normal gripping position.

Figure 1:
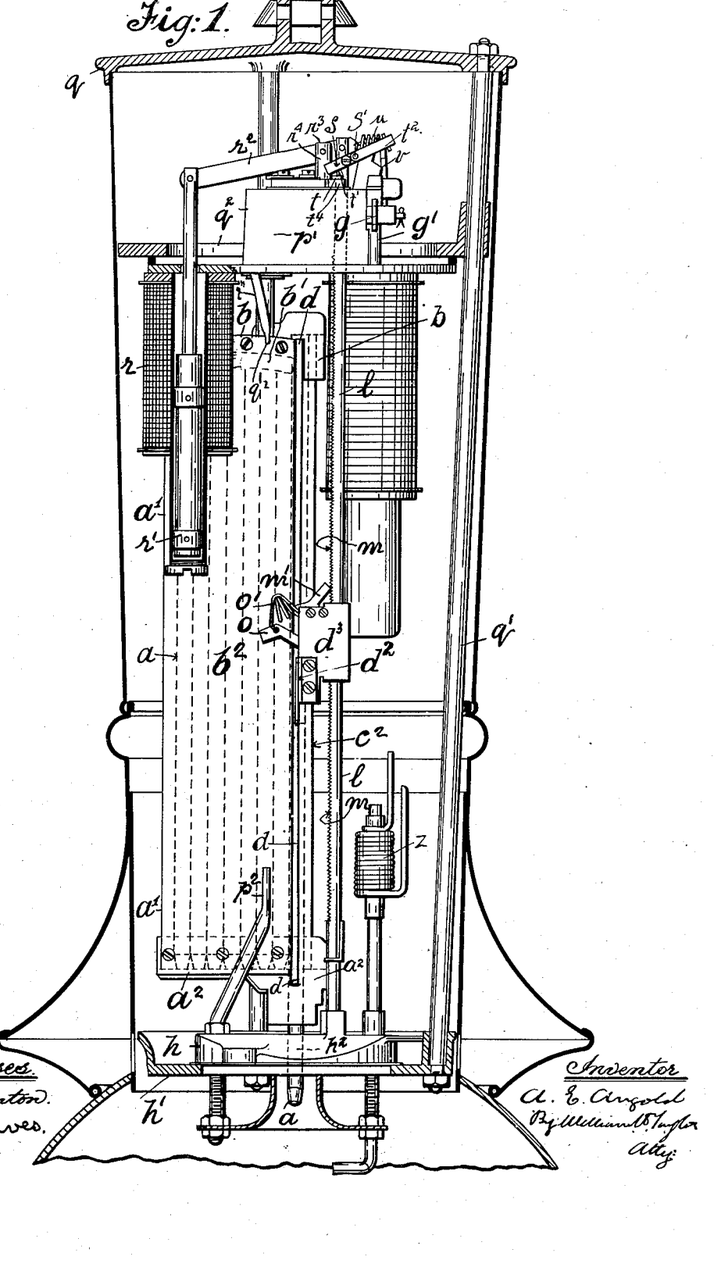
Figure 1 is a section on the line A—A of Fig. 2 with the lower part of the left-hand magazine removed, Fig. 2 similar elevation at right angles thereto, Fig. 3 partial elevation of the lamp from the opposite side to that shown in Fig. 2, Fig. 4 side elevation to an enlarged scale of a portion of the movable magazine of the lamp.
Figure 2:
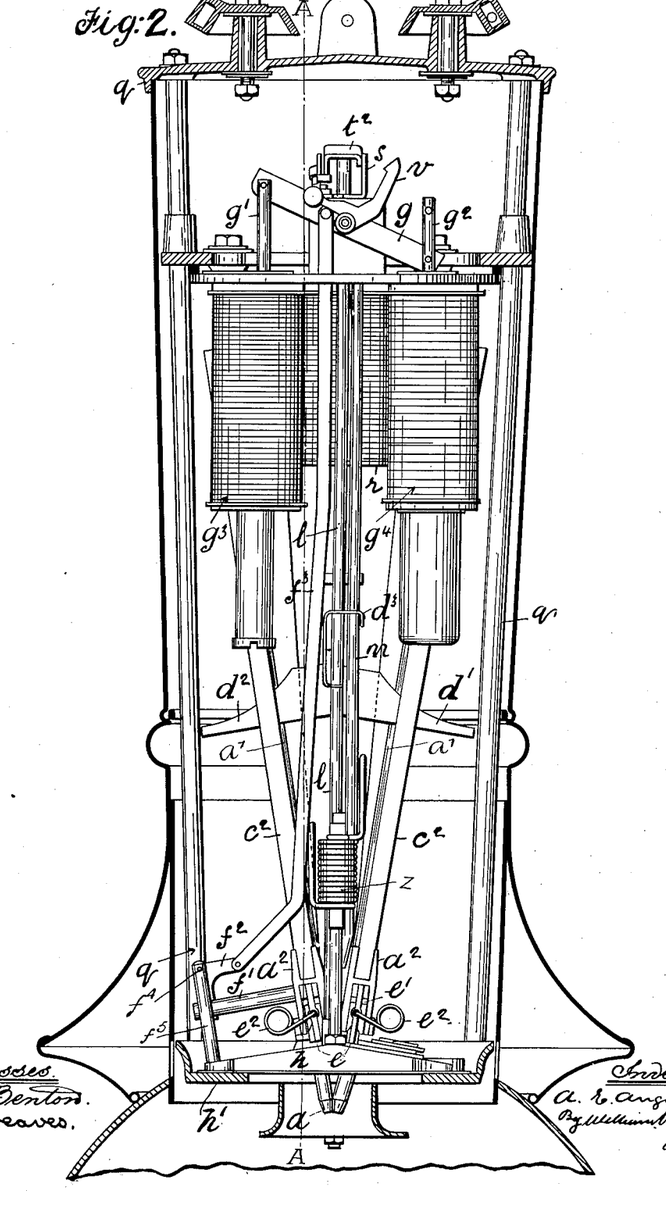
Figures 3, 4, 5:
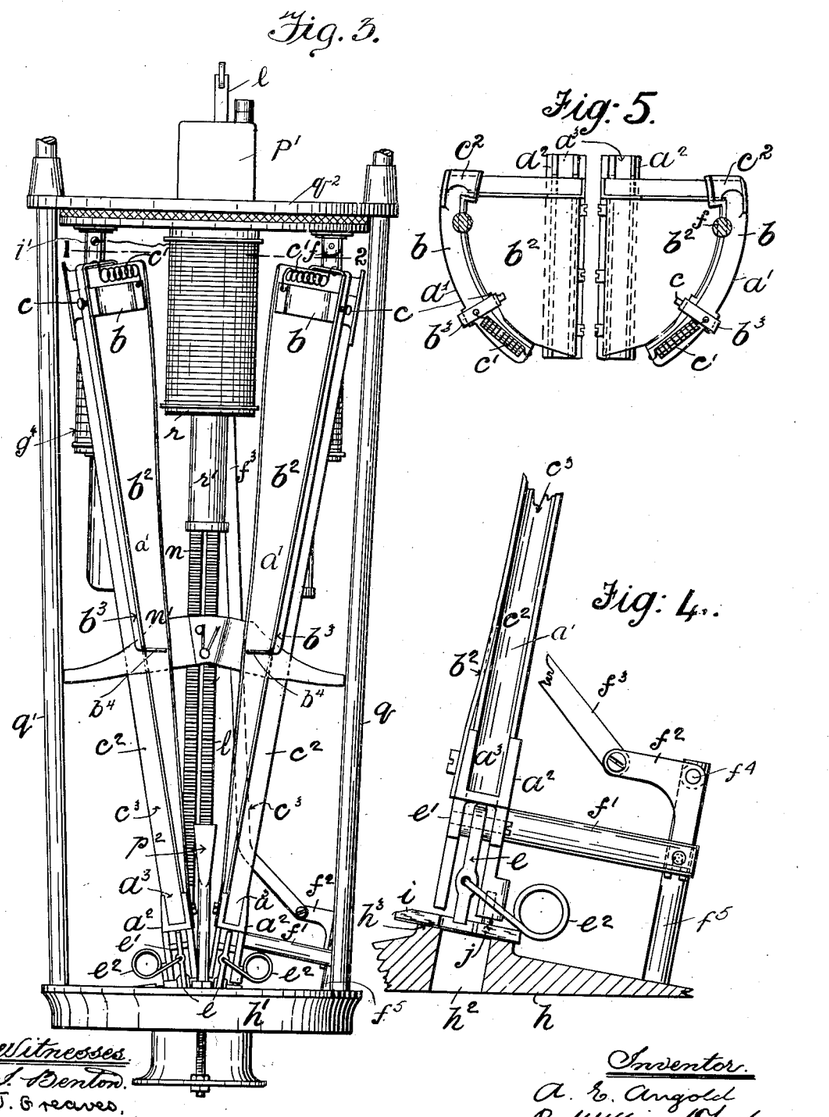

The magazine at the left in Fig. 2 and at the right in Figs. 3 and 5 and shown in Fig. 4 is pivoted at the top to a stud $f$ or other suitable connection to enable its lower end to be advanced toward or to be receded from the other magazine, which is fixed and consequently the carbons can be brought together and pulled apart to strike the arc in the usual way by the usual electro-magnetic controlling gear. For this purpose the magazine has coupled to a projecting arm $f^1$ carried by it, one arm of a bell crank lever $f^2$, the other arm of which is coupled to a rod $f^3$ whose upper end is connected to a beam lever $g$, the ends of which are, in turn, pivoted to rods $g^1$ and $g^2$ connected to the iron cores of the coils $g^3$ and $g^4$ respectively. The bell crank lever $f^2$ is pivoted at $f^4$ to a rod $f^5$ which is suitably supported on the base bracket $h$ secured to the bottom frame $h^1$ of the lamp. The bracket $h$ has a hole $h^2$ through which the carbon passes, and resting on an inclined face $h^3$ around it is a plate $i$ formed with a hole also and with pins $j$ projecting into holes in the bracket $a^2$. The plate slides across the hole $h^2$ as the magazine moves and forms a joint to exclude gases while the pin connection allows slight movement in a direction longitudinally of the magazine while preserving the joint. The other magazine is fixed and suitably supported by a member $i$ connected to it and to the upper part of the lamp frame and by the member $a^2$ which rests upon the bracket $h$.

The push bar consists of a fixed arm $d^2$ and an arm $d^1$ pivoted to it at $k$. The free end of the latter is normally pushed in a downward direction by a spring $k^1$ bearing against a stud $k^2$, Fig. 8. The lower edges of the arms preferably stand at right angles to and rest on the respective carbons which they have to force downward. The arm $d^2$ has an extension $d^3$ loosely embracing rods $l$ and $n$ the latter being fixed and the combined bar is obliged to force down the two carbons evenly. The free movement of the arm $d^1$ is restricted, by the spring $k'$ which tends to lift the arm $d^2$ when the arm $d'$ is supported by the immovable carbons in the fixed magazine, this action leaving the other magazine perfectly free to swing. The rods $l$ and $n$ which guide the push bar have teeth $n$, $n'$ cut on them, and suitable pawls $m'$ and $n$ pivoted at $m^2$ on the bar engage with the teeth, so that when the guiding rod is made to vertically reciprocate they act on the pawls and force the bars down step by step. With each upward movement of the rod $l$ the spring $k^1$ on the arm $d^2$, Figs. 6 to 8, tends to make all the weight remain on the carbon in the fixed magazine as before described. The pawl is double-ended so that it can be reversed and used for an upward motion of the push bar when it is required to raise the latter, that is to say, when it is necessary to get it on top of a new carbon the pawl is reversed so that the upward movements of the rod lift the push bar while with a downward movement of the rod, the bar is partially supported by the side pressure of the inoperative carbons.

The pawls $m^1$ and $n^2$ are controlled by trip gear, which reverses their action when the push bar has reached the limit of the required movement, that is to say, when its lower edges have been pushed below the bottom groove $a^3$, the action is reversed and the bar climbs up until its lower edge is above the tops of the carbons in the magazines, when the action is again reversed, and the bar begins to descend, forcing down the carbon which, in the meantime, has got underneath it. This trip gear preferably consists of a pivoted arm $o$, and a spring $o^1$, in compression, between a point $o^2$ on this arm and suitable points in the form of a pin $o^3$ on the pawls $m^1$ and $n^2$. The arm $o$ is pivoted at $p'$ on the extension $d^3$ so that the line of compression of the spring is made to swing over the pivots of the pawls, and in this way the latter are made to fly over from one side to the other, there being a double snap effect and the arm, being the first to be thrown over, gives through the medium of the spring $o^1$ a sharp and decided snap in throwing over the pawls, making it impossible for them to remain in an intermediate position. The reversing movements of the pivoted arm $o$ are controlled by its coming against suitable stops $p^2$ and $p^3$ fixed respectively to the bottom $h$ and top $q^2$ of the lamp frame $q$.

The rod $l$ has its reciprocatory movement controlled by a suitable electro-magnet or solenoid $r$ acting on an iron armature $r^1$. The circuit through the solenoid, which is preferably a shunt to the arc, is made and broken by the movement of the armature itself, so that it makes a continuous up and down motion which is transmitted to the toothed rod $l$ coupled to it by a lever $r^2$ pivoted at $r^3$ to a stud $r^4$ suitably mounted on the member $p^1$. The contact for making and breaking this solenoid circuit has a similar action to that of the pawls $m^1$ and $n^2$, making and breaking the circuit with a decided action, but necessitating a full stroke of the iron core $r^1$ before the action takes place. The mechanism consists of a frame $s$ pivoted at $s^1$ to a bracket $s^2$ secured to the member $p^1$, one arm of $s$ carrying a carbon contact $t$ operating in conjunction with a similar contact $t^1$ secured to member $p^1$. A second frame $t^2$ is pivoted to $s$ at $t^3$ and $s^1$ and has coupled to it one end of a spring $u$ in tension, the other end of which is connected to the lever $r^2$ near to the reciprocatory rod $l$. The contact mechanism is also controlled by a counter-weighted detent $v$ pivoted to lever $g$ which forms part of the arc-controlling mechanism, this detent being removed from contact with frame $t^2$ when it is necessary for the carbons to be pushed downward. It engages with $t^2$ and stops the action when the carbons have been sufficiently fed. The pivotal points $s^1$ and $t^3$ are arranged out of axial alinement; and by allowing sufficient freedom or play between these pivots and their respective bearings, a somewhat erratic action is effected; the effect being equivalent to advancing the point $t^3$ only half the distance from the point $s^1$. In other words: If a line is drawn concentrically through the pivots $s^1$ and another line is drawn concentrically through the pivot $t^3$, these lines will be spaced apart from the intervening axis of the spring $u$. The object of this arrangement is to give the frame $t^2$ a certain amount of movement before the line of the spring tension crosses the axial line of the pivots $s^1$; therefore the reversing action is started before the pressure of the pawls is entirely released, so that when the action is begun the mechanism flies over the dead center.

The detent $v$ is so arranged that the contact is always made with a sharp blow, also the carbon contacts are set to give a slanting blow, which together with the force of the blow tends to keep the contact faces clean. I have found that carbon contacts which are brought together slowly are liable to make bad electrical contact.

I do not, however, restrict myself to the use of carbon contacts because some metals can be successfully used in a similar manner. The combined action of these parts will produce the reciprocation of the rod $l$, the lowering of the member $d$, the feeding of the carbons, the reversing of the pawls $m'$ and $n^2$ when they come into contact with the stops, the consequent lifting of the push bar, and the forcing down of a new pair of carbons; the stumps of the old carbons in the meantime remaining burning, being supported by the spring contact jaws $e$ before described, until the descending new carbons push them out altogether.

The "make and break" action of the feeding magnet or solenoid $r$ needs to be stopped when all the carbons are consumed, and this is done by the push bar coming under the spring-controlled arms $b^3$ which as described normally press against the last carbon in each magazine. They prevent the upward movement of the push bar, and also the return movement of the armature $r^1$, thus keeping the contacts $t$, $t^1$ open until the lamp is recharged.

Figures 13, 14, 15, 16, 18:
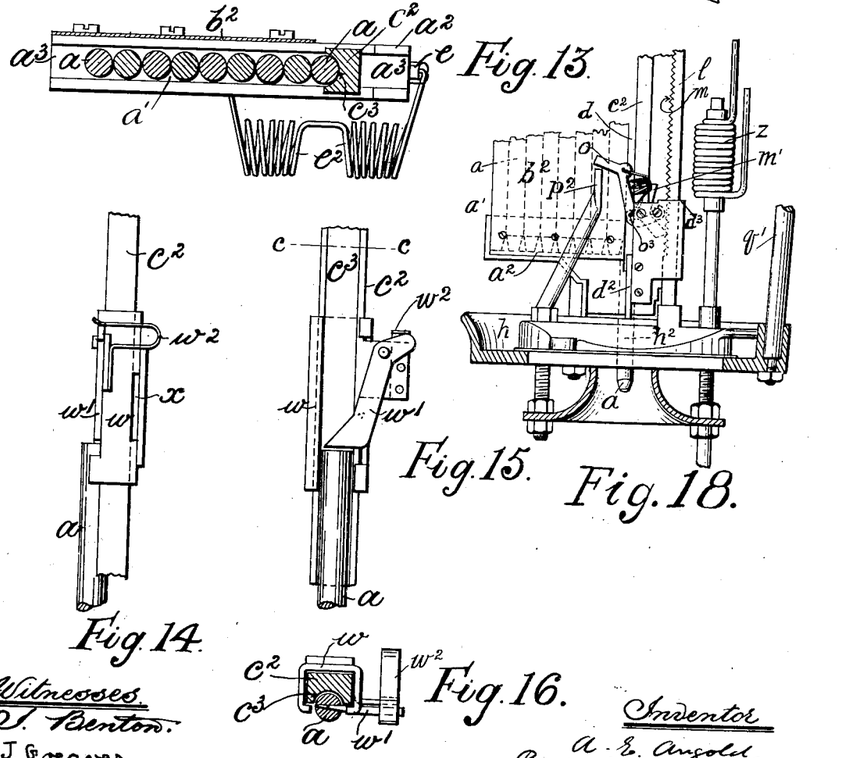
Figure 17:
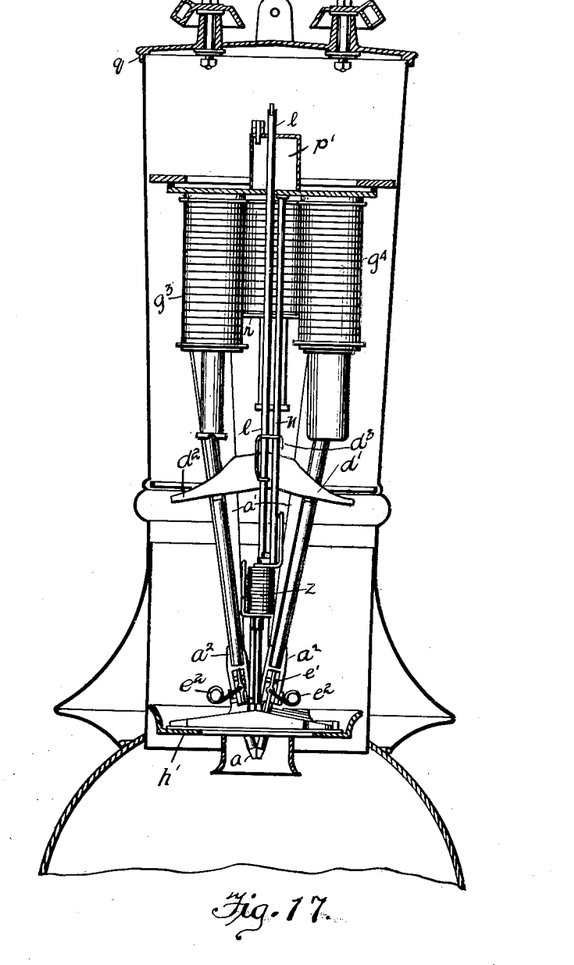
Fig. 17 is a vertical section of Fig. 1 taken just to the right of the rod $l$ showing the rod $c^2$ removed and the operative carbons in position beneath the arms $d$ and $d'$.
Figure 19:
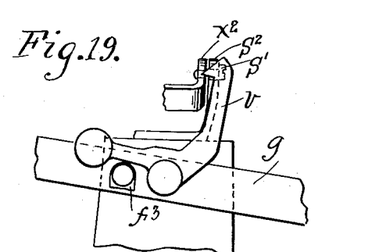
Fig. 19 is a detail view of the make and break member $v$, in engagement with the member $t^2$.

In the lamp as described the push bar ascends and descends between the edges of the plates $b^2$ and grooved rods $c^2$; but I may arrange it to pass behind the latter and employ in conjunction with its arms $d^1$ and $d^2$ means for engaging with the carbons. The arrangement is shown in Figs. 14 to 16. On each grooved rod $c^2$ is mounted a slidable sleeve $w$ of a suitable character, to an arm of which is pivoted an arm or foot $w^1$ normally resting on the upper end of the carbon $a$, its other end engaging a spring $w^2$ to keep it in position though the arm may be weighted for the same purpose.

$x$ is a slot through which is freely passed one of the arms of the push bar, the opposite arm passing through a corresponding slot in the second sleeve of the other grooved rod $c^2$. The arms in this case are each parallel to enable the sleeves $w$ to accommodate themselves thereon in accordance with their converging movement due to the angle between the grooved rods $c^2$. This device acts as follows:—The lower ends of the pivoted arms $w^1$ rest on and push down the carbons in the manner and by the mechanism previously described. When they descend below the grooves $a^3$ fresh carbons are fed forward laterally and on the reversal of the push bar the arms $w^1$ are pushed outward by the new carbons. On the push bar reaching the top of the latter the arms again fall forward into operative position ready for the downward motion.

I would have it understood I do not confine myself to the use of an electro-magnet or solenoid and armature for operating the reciprocable rack rod, as other means may be employed to effect reciprocation.

The operation of my lamp is as follows:— When the lamp is out of service and the current cut off the pivoted magazine is in its innermost position and the carbons in contact with one another. The armature of the solenoid $g^3$ is at the limit of its upward movement while the armatures of the solenoids $g^4$ and $r$ are at the limits of their downward movement. When the circuit is closed the armatures of the solenoids $g^3$ and $r$ will begin to ascend step by step, there being two currents, one through the shunt coil $g^3$, and the other through the coil $r$.' The armature $r'$ gradually raises the lever $r^2$ thus lowering the rod $l$ which carries with it the member $d^3$ and the arms $d'$ and $d^2$ these latter bearing against the operative carbons and feeding the same as they are used up. As soon as the carbons touch, the consequent heavy current passes through series coil $g^4$, which, overcoming the power of shunt coil $g^3$ which has been weakened by the carbons touching and reducing the voltage across it, results in the lifting of $g^2$ which acts through the medium of the lever $f^3$, the bell crank $f^2$ and the rod $f'$ in such manner as to cause the swinging magazine to travel away from the other one, thus separating the points of the carbons the proper distance in order to give the correct resistance to the arc. When the armature $r'$ has reached the limit of its upward movement the spring $u$ pulling downwardly upon the bracket $t^2$ causes the latter to snap, separating the contacts $t$ and $t'$ and breaking the circuits in the solenoids $r$ and $g^3$. When the outer end of the bracket $t^2$ snaps downwardly the hook or detent $v$ will catch and hold it, provided the coil $g^2$ has risen sufficiently to bring said hook into contact with the bracket $t^2$. It follows that $t^2$ will not be engaged by $v$ until the carbons have been fed a sufficient distance and the pivoted magazine is swung outwardly in order to separate the carbons far enough to give the arc the correct resistance. At almost the same instant when the circuit is broken the armatures of the solenoids $r$ and $g^4$ drop to their lowest position of their own weight, which, through the medium of the lever $r^2$, raises the spring $u$ into such a position that the resistance offered by the detent $v$ is overcome, said detent is swung aside and the bracket $t^2$ snaps back into its original position, closing the circuits in the solenoids, and permitting them to ascend as before. It will be understood that when the armature $r'$ descends, the rod $l$ is raised, the action of the pawls $m'$ and $n^2$ preventing the member $d^3$ from rising. This action is repeated until the carbons are fed below the grooves $a^3$. When the carbons reach this point the stop $p^2$ will trip the member O thus reversing the pawls $m'$ and $n^2$. The reversal of the pawls permits the member $d^3$ to be raised and, as the carbons no longer offer any resistance to the working of the solenoids, the armatures of these latter will work rapidly back and forth as before described thus raising the member $d^3$ to the top of the space $d$. When $d^3$ reaches the limit of its upward movement a fresh carbon is forced laterally into the bed $c^3$ of the rod $c^2$, the member $o$ comes into contact with the upper stop $p^3$, the pawls are again reversed and the new carbon fed downwardly as before described, forcing out the stumps of the old carbon in its downward course. Of course, as soon as the arms $d'$ and $d^2$ contact the new carbon, resistance is rendered to the action of the armatures and the latter work only so fast as the carbons are used up. This action is repeated as long as the lamp is in use or as long as fresh carbons remain in the magazines. When the last carbon has been used the arms $b^3$ will engage the arms $d'$ and $d^2$ as before pointed out and prevent them from being raised, and consequently prevent the solenoids from working. When the current is cut off the armatures of the solenoids $r$ and $g^4$ drop to their lowest positions of their own weight, the other parts remaining in position.

What I claim as my invention and desire to secure by Letters Patent is:—

1. In a magazine arc lamp carbon magazines each comprising a bottom bracket with a straight groove, a top inverted bracket with a curved groove, a twisted plate connecting the brackets together and forming a guide for assembling the inoperative carbons, a grooved rod for the operative carbon and a spring-controlled arm for putting lateral pressure on the carbons substantially as described.

2. In a magazine arc lamp a magazine containing carbons, means for actuating the carbons, spring pressed gripping devices for the operative carbons, said gripping devices being pivoted to said magazine and having arms of arcuate form, the center of the arc of the arms coinciding with the center of the pivot.

3. In an arc lamp a carbon magazine, means for gradually ejecting carbons from the magazine, said means comprising a vertically movable push bar, means for actuating said push bar comprising a stationary toothed rod and a vertically reciprocating toothed rod, and a mechanism united with said push bar and adapted to engage the teeth of said toothed rods for actuating the carbons.

4. In a magazine arc lamp the means for pushing down the carbons consisting of a push bar having two arms one pivoted to the other and spring-controlled, said arms being slidable in spaces in the carbon magazines, a vertically reciprocable rack rod on which the push bar slides, an electromagnet or solenoid actuating an iron armature, an electric circuit comprising a shunt to the arc, said circuit being made and broken by the movement of the armature itself, and adapted to give a continuous up and down motion when the potential is below a certain given normal, means for coupling the armature to the rack rod, a stationary rack rod alongside the movable rod and a pawl device carried by the push bar and controlled by trip gear consisting of a pivoted trip lever, a spring in compression between a point on the trip lever and points on the pawls, and stops with which the trip lever engages substantially as described.

5. In a magazine arc lamp the means for pushing down the carbons consisting of a push bar having two arms, a vertically-reciprocable rack rod on which the push bar slides, means for reciprocating the rack rod, a stationary rack rod alongside the movable rod and a pawl device carried by the push bar and controlled by trip gear consisting of a pivoted trip lever, a spring in compression between a point on the trip lever and points on the pawls, and stops with which the trip lever engages substantially as described.

6. In a magazine arc lamp the combination with a reciprocable rack rod of a stationary rack rod device consisting of double-ended pawls pivoted to a frame slidable on the reciprocable rack rod and on the stationary rod, said pawls being adapted to engage with teeth on the rack rod, a trip gear in conjunction with the pawls consisting of a pivoted trip lever, means for tripping the lever, and a spring for normally retaining the tripped lever in either of two alternative positions.

7. In a magazine arc lamp, a stationary magazine, a pivotally movable magazine, each magazine comprising an upper and a lower channeled member for containing the respective ends of the carbons, a rectilinear grooved member uniting said upper and lower members of each magazine, means for transferring the carbons from the said upper and lower members into said rectilinear member, means for projecting the carbons from said rectilinear member, and frictional clamping means for properly retarding the projection of the carbons.

In testimony whereof I have hereunto set my hand in the presence of two witnesses.

ARTHUR ERNEST ANGOLD.

Witnesses:
WILLIAM HENRY TAYLOR,
AMY E. EVINS.